June 19, 1945.    J. J. DICKSON ET AL    2,378,395
METHOD AND APPARATUS FOR TELEMETERING FLIGHT TEST DATA
Filed Aug. 5, 1943    3 Sheets-Sheet 1

INVENTORS
JAMES J. DICKSON
ORVILLE R. ROGERS

INVENTORS
JAMES J. DICKSON
ORVILLE R. ROGERS
BY
ATTORNEYS

June 19, 1945.   J. J. DICKSON ET AL   2,378,395
METHOD AND APPARATUS FOR TELEMETERING FLIGHT TEST DATA
Filed Aug. 5, 1943   3 Sheets-Sheet 3
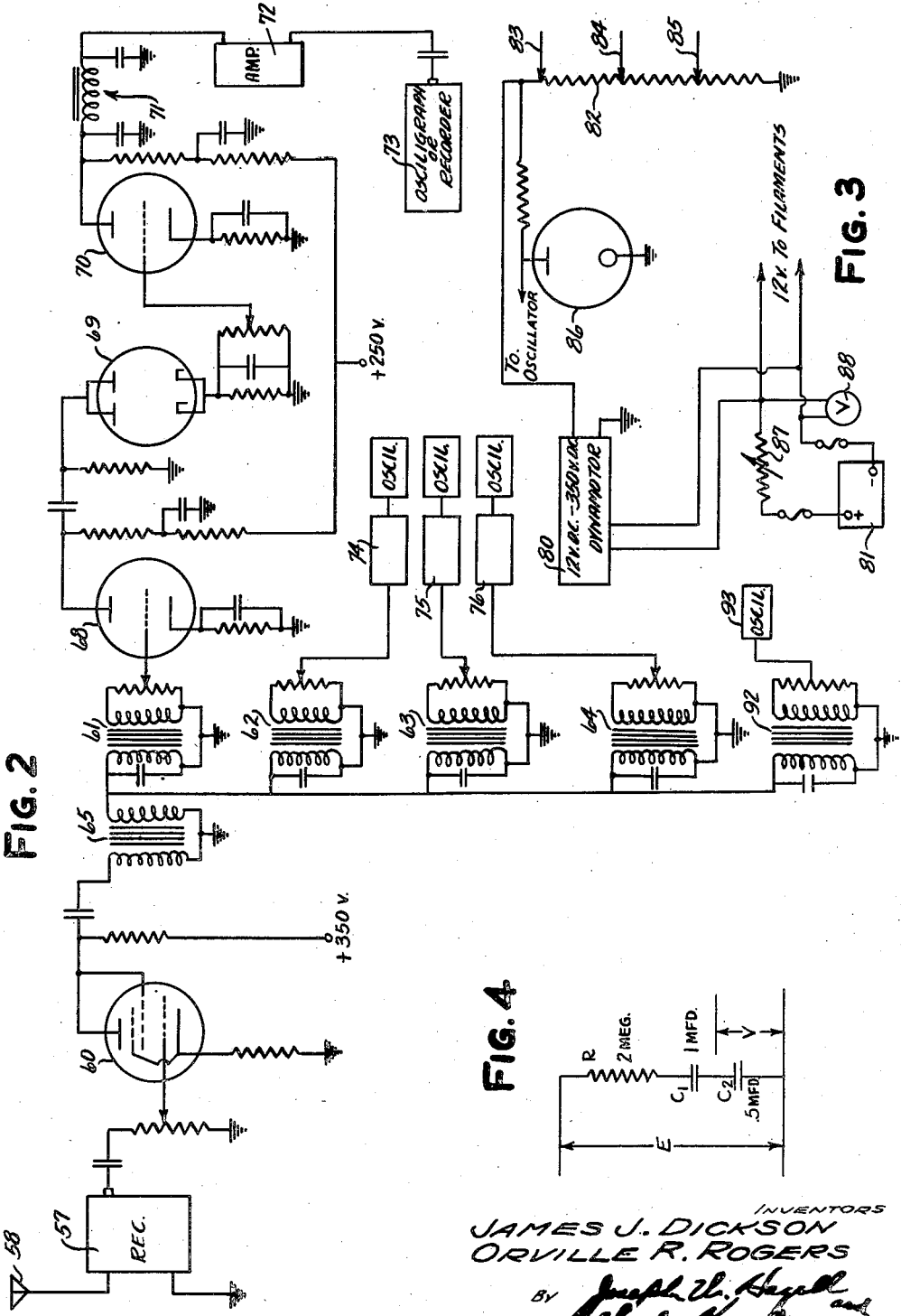
INVENTORS
JAMES J. DICKSON
ORVILLE R. ROGERS
BY
ATTORNEYS Patented June 19, 1945

2,378,395

UNITED STATES PATENT OFFICE 2,378,395

METHOD AND APPARATUS FOR TELEMETERING FLIGHT TEST DATA

James J. Dickson and Orville R. Rogers, Dayton, Ohio

Application August 5, 1943, Serial No. 497,530

1 Claim. (Cl. 177—351)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a system for analyzing the flight characteristics of an aircraft and more particularly to a method and apparatus for telemetering the various flight data to a receiving station located on the ground where it is recorded in permanent form.

It has been customary in the past to flight-test a new type of aircraft by employing a highly skilled test pilot to fly the craft and at the same time to jot down the readings from the various flight test instruments on a data record sheet. It has been found impossible, however, for even the most highly trained test pilot to faithfully record the many instrument readings at the same time that he is putting the plane through complicated and difficult test maneuvers. In order to improve upon this type of flight testing, an automatic recording apparatus was devised for recording the readings from the many flight test instruments on a film or tape. This equipment was installed in the airplane and functioned to automatically record the various test data without any attention on the part of the pilot. This method of testing, however, has also proved to be unsatisfactory, this being in part due to the size and weight of the automatic recording apparatus which makes it difficult to install in small fighter craft and in part due to the fact that should the ariplane crash during the test flight, no record would then be available to show the cause of the failure.

It is, therefore, an object of our invention to provide a method and an apparatus for telemetering the various flight test data obtained from an aircraft in flight to a receiving station located on the ground where the data is recorded in permanent form for future analysis.

Another object of our invention is to provide apparatus for simultaneously transmitting over a single radio-frequency carrier wave several low-frequency signals, each representing an aircraft instrument reading, a history of the vibratory motion of some part of the aircraft, or other similar phenomena, from the aircraft to a receiving station located on the ground.

A further object of our invention is to provide a method for simultaneously transmitting over a standard aircraft radio transmitter to a receiving station on the ground the various flight test data obtained from pickups or other instruments located on the aircraft.

Still a further object of our invention is to provide a method and an apparatus for transmitting a plurality of data from an aircraft to a ground station by applying each of the various data to a separate audio-frequency carrier wave as modulation thereon, which carrier waves are then mixed together to form a single complex wave which is transmitted to the ground station by means of a standard aircraft radio transmitter.

Still a further object of our invention consists in providing a method for transmitting data from an aircraft to a ground station by the steps of converting the data into low-frequency audio signals, modulating a separate audio-frequency carrier wave with each of these signals, combining the modulated waves into a single complex wave, modulating a radio-frequency carrier wave with the complex wave, transmitting the modulated radio-frequency wave to the ground station, demodulating the radio-frequency carrier wave so as to obtain the complex audio-frequency wave, resolving the latter wave into the various modulated audio-frequency carrier waves, demodulating each of the latter waves so as to obtain the original low-frequency signals, and applying the latter signals to a recording instrument.

Another object of our invention consists in providing the necessary apparatus for carrying out the above-mentioned method.

The operation of our improved device for transmitting flight test data from an airplane in the air to a radio receiving station located on the ground depends essentially upon the modulation of each of several audio-frequency signals by a lower frequency signal representing any of the mechanical or electrical quantities obtained from the various test devices carried on the aircraft. These modulated audio-frequencies are then mixed together to form a complex wave which is fed into a standard aircraft radio transmitter which then sends the complex wave to a receiving station on the ground as modulation on a radio-frequency carrier wave. There the several audio frequency signals are separated from the complex wave appearing in the output of the receiver by a series of band-pass filters after which the various audio signals are detected so as to yield the original low-frequency signal of the instrument or other test device mounted on the aircraft. The low-frequency signals are then recorded simultaneously on separate recording instruments of any suitable type.

It will be seen that our improved form of apparatus and method of transmitting data from an aircraft to a ground station has the advantage over the former automatic recording devices carried on the aircraft in that the size and weight of the equipment carried by the aircraft is greatly reduced and also in that the data is recorded at a receiving station on the ground where it is safe from injury in the event of a crash of the test craft.

A preferred embodiment of our invention will be hereinafter described with reference to the accompanying drawings, given merely by way of example, in which Figure 1a is a wiring diagram of the rotary switching mechanism used for sequentially applying the low-frequency waves from the several groups of pickups or other testing instruments to the four audio-frequency channels incorporated in the apparatus carried on the aircraft;

Figure 2 is a wiring diagram of the equipment installed at the ground station which consists in general of a conventional radio receiver, a series of band-pass filters, a demodulator associated with each band-pass filter, and a recording instrument associated with each demodulator for recording the test data in permanent form;

Figure 3 is a wiring diagram of a suitable form of power supply for energizing the apparatus shown in Figures 1a and 1b;

Figure 4 is a wiring diagram of an integrating circuit which is capable of producing a voltage which is proportional to the amplitude of the vibratory motion of a moving-coil type pickup.

The apparatus shown in the accompanying drawings was originally designed for the purpose of furnishing a record of the flutter characteristics of the wings and tail surfaces of an aircraft. As will be later described, however, the apparatus can readily be adapted to record other flight test data such as air speed readings, accelerometer data and any other phenomena which may be represented by an audio-frequency voltage.

In order to record the character of the flutter experienced in various parts of the aircraft, vibration pickups are used to transform the vibratory motion of the various parts being tested into an equivalent oscillatory electrical voltage which is then used to modulate an audio-frequency carrier signal. The vibration pickups may be similar to the standard Sperry-M. I. T. electromagnetic pickup consisting of a permanent magnet having two concentric cylindrical poles, one of the poles surrounding the other in such a fashion as to enable a coil wound on a cylindrical shell to be fitted between the poles and to be concentric therewith. The coil is rigidly attached to the case, which in turn is fastened to the part of the aircraft being tested. The magnet is suspended from the case by springs so that the magnet spring system has a natural frequency in the order of a few cycles per second. In this way, when the case is vibrated at frequencies above this limit, the magnet acts as a seismic mass and remains stationary while the coil moves relative to the magnet. This relative motion causes the coil to cut across the lines of magnetic flux and thereby develop a voltage across the terminals of the coil which is proportional to the relative velocity of the coil and magnet. Since the magnet remains stationary, the output voltage of the pickup will be proportional to the velocity of the vibratory body upon which it is mounted.

Figure 1A:
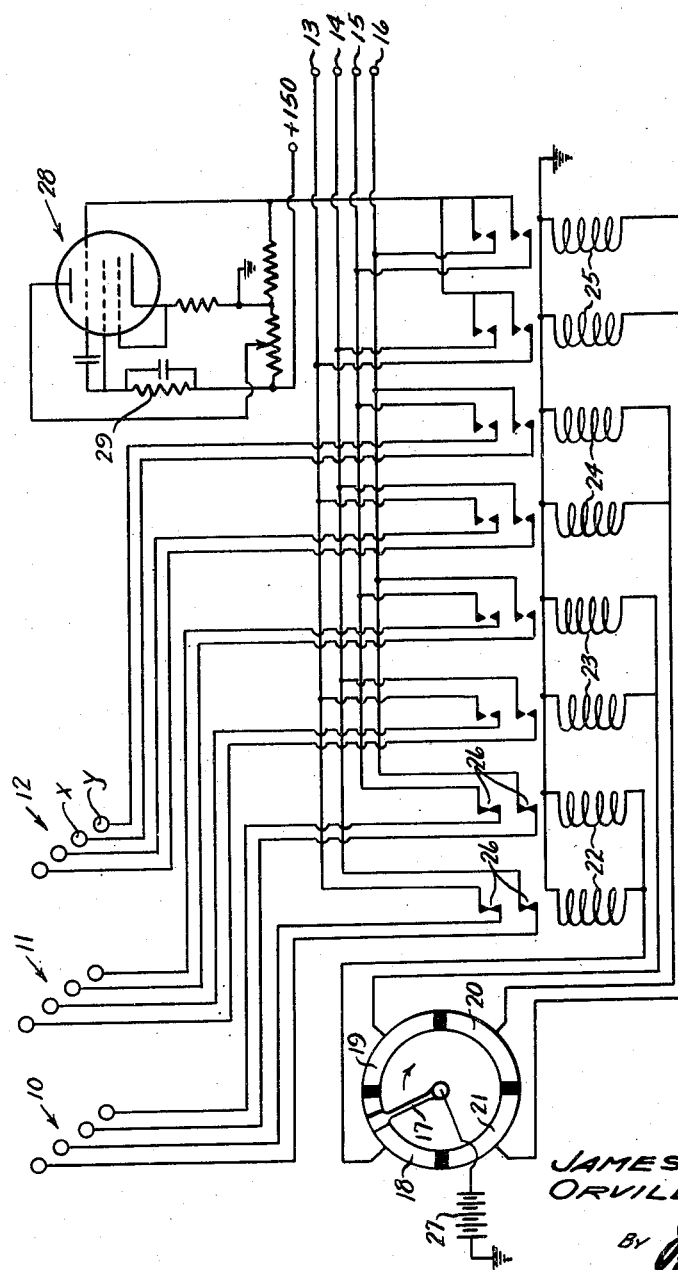
Figure 1b is a wiring diagram of the remainder of the equipment carried on the aircraft, this equipment consisting in general of an integrating circuit, an audio oscillator and modulator, a mixing circuit, and a conventional aircraft radio transmitter.

The structure herein shown and described is provided with only four audio channels for handling the output from twelve vibration pickups. The pickups are therefore divided into three groups of our each and a switching device is provided for sequentially connecting each group of pickups to the four channels. The means for accomplishing this is shown in Figure 1a where the twelve pickups are divided into three groups 10, 11 and 12 of four pickups each. The pickups of each group are successively connected with the four audio channels 13, 14, 15 and 16 by means of a switch consisting of a constantly rotating arm or brush 17 which wipes across the four contact segments 18, 19, 20 and 21 to thereby cause the battery 27 to successively energize the four pairs of relay coils 22, 23, 24 and 25. The arm 17 is rotated at low speed by any suitable form of power means (not shown). Each of the relay coils, when energized, will actuate an armature carrying two sets of contacts 26, each of which will, when closed, connect one of the pickups with one of the four audio channels 13, 14, 15 and 16. As shown in Figure 1a, the rotating brush 17 is in contact with the segment 18, thereby energizing the pair of relay coils 22 which actuate their respective armatures and close the contacts 26 so as to connect the four pickups of group 10 to the four audio channels. Similarly, when the brush 17 reaches the segment 19 the relay coils 23 will be energized so as to cause the four pickups of group 11 to be connected to the audio channels 13, 14, 15 and 16. In a like manner the pickups of groups 12 will be connected to the four channels when the rotating brush reaches the contact segment 20. Inasmuch as it is desired to intermittently apply a constant voltage-constant frequency signal to the channels for calibrating purposes, a fourth segment 21 is provided for causing the relay coils 25 to be energized once on each revolution of the brush 17. This will cause the output from a stabilized transitron oscillator, indicated generally at 28, to be applied to each of the four audio channels. The oscillator 28 is tuned to a frequency of approximately 50 cycles per second by means of a resistance-capacitance circuit 29. The plate voltage for the oscillator tube is stabilized at substantially 150 volts by means of a voltage regulator tube in the power supply and, as a result, the oscillator supplies a signal which may be considered constant in both frequency and voltage under all conditions of operation.

Since the output voltage of the pickups is proportional to the velocity of the vibratory motion to be recorded, and since it is desirable to have instead a voltage which is proportional to the amplitude of the motion, an integrating circuit of some sort must be used. One such circuit which has been found satisfactory is shown in Figure 4.

The velocity of motion of a body is related to the amplitude of motion by $$\frac{dx}{dt}=v$$

where $x$ is the amplitude, $v$ the velocity, and $t$ the time. Hence $$x=\int v\,dt \qquad (1)$$

In sinusoidal motion $$v=v_0 \sin 2\pi ft \qquad (2)$$

where $v_0$ is the maximum velocity and $f$ is the frequency. Hence $$x=-\frac{v^0}{2\pi f}\cdot \cos 2\pi ft \qquad (3)$$

The function of the integrating circuit is then to produce from the input voltage E, proportional to $v$ in Equation 2, an output voltage V, proportional to $x$ in Equation 3.

The circuit shown in Figure 4 is used to accomplish this. Consider a voltage $E = E_0 \sin 2\pi f t$ impressed across the input terminals in this circuit, then $$E = \left(R + \frac{1}{jwc_1} + \frac{1}{jwc_2}\right)i$$

$$i = \frac{E}{\left(R + \frac{1}{jwc_1} + \frac{1}{jwc_2}\right)}$$

$$V = i \cdot X_{c_2} = \frac{E}{\left(R + \frac{1}{jwc_1} + \frac{1}{jwc_2}\right)} \cdot \frac{1}{jwc_2}$$

$$= \frac{E}{jwc_2 R + \frac{c_2}{c_1} + 1} = \frac{E}{jw \cdot .5 \cdot 10^{-6} \cdot 2{,}000{,}000 + 1.5}$$

$$= \frac{-j}{2\pi f + 1.5} \cdot E$$

When $f$ is greater than 10 C. P. S., the second term in the denominator is negligible compared to the first and, therefore, $$V = \frac{-j}{2\pi f} \cdot E$$

$$V = \frac{-E_0}{2\pi f} \cdot \cos 2\pi f t \quad (4)$$

since multiplication of a sin function by $j$ is equivalent to shifting the phase by 90 degrees. Equation 4 is the counterpart of Equation 3 and, therefore V is the integrated value of E or V is proportional to $x$ the amplitude of vibration, when E is proportional to V.

In this type of integrating circuit the value of the output voltage is much less than that of the input voltage and, therefore, some amplification must be provided to enable this signal to modulate the audio frequency carrier.

Figure 1B:
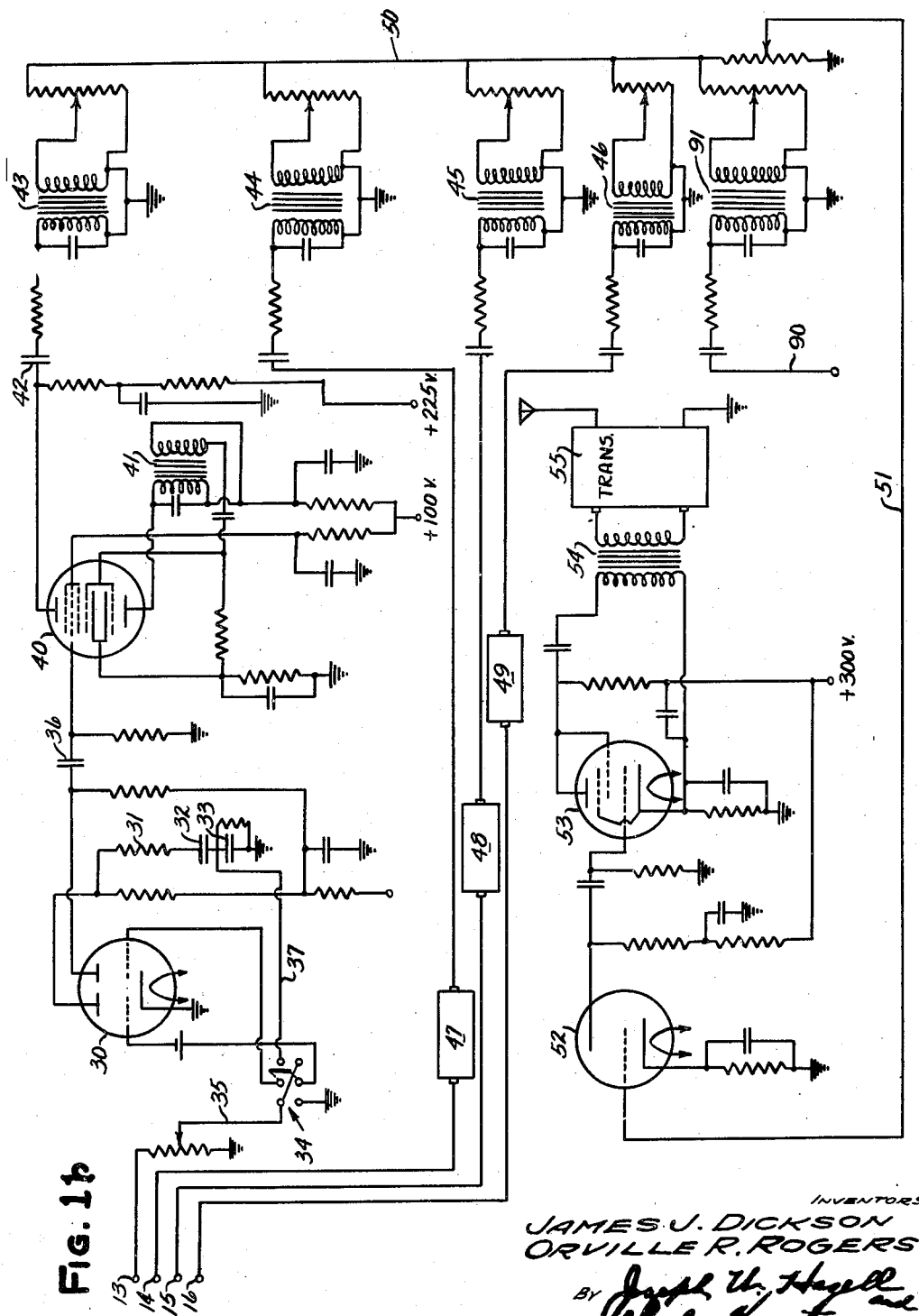

Since this part of the equipment is to be installed in the aircraft it is desirable to keep the weight and size thereof to a minimum. Accordingly, a dual purpose tube 30 (Figure 1b) having two triodes in a single envelope is used as a two-stage buffer amplifier. In this circuit the integrating network, which is comprised of a resistor 31 and two capacitors 32 and 33, is placed between the two stages of triode amplication so as to isolate it from the remainder of the circuit. A double-pole, double-throw switch 34 is provided for eliminating the integrating circuit and the first stage of amplification in case this is found to be desirable. This may be accomplished by throwing the switch to the left as seen in Figure 1b, thereby connecting the input lead 35 from one of the channels 13, 14, 15 or 16 directly to the right-hand grid of the tube 30 while the grid of the left-hand section is connected to ground. The right-hand section of the twin triode tube then amplifies the signal applied to its grid and passes it to the following tube through the coupling condenser 36. By throwing the switch 34 to the right, the input lead 35 is connected to the grid of the left-hand section of the triode 30. After being amplified by this section of the tube, the signal is applied to the integrating circuit and the output from this circuit, which consists of the voltage across the capacitor 33, is then applied to the grid of the right-hand section of the tube 30 by way of the conductor 37. After being amplified by this section of the tube the signal is transmitted to the following tube through the coupling condenser 36 which should be as large as possible consistent with the requirement of stability of the circuit.

In order to provide for the simultaneous transmission of several variable frequency signals over a single radio-frequency carrier wave, each of the signals is applied as modulation on one of four audio-frequency carrier waves of constant frequency. Each of the four audio-frequency carrier waves are assigned a different frequency in order to enable the carrier waves to be separated from one another by band-pass filters at the ground station. Since, as in the case of the integrating amplifier, small size and weight are desirable, a dual purpose tube is used both for generating the audio-frequency carrier wave and also for modulating it with the integrated signal from the pickup. The oscillator-modulator tube 40 which is used for this purpose, contains both a triode unit and a hexode unit in the same envelope. The triode section of the tube is used for generating the audio-frequency carrier wave, the plate current variations being fed back into the grid so as to produce self-generated oscillations by means of the feed-back transformer 41. The control grid of the hexode unit is connected directly to the grid of the triode unit so as to impress the audio-frequency oscillations on the electron stream flowing through the hexode unit. Modulation of the audio-frequency carrier wave is accomplished by applying the integrated signal to the injector grid of the hexode unit through the coupling condenser 36. The output of the hexode unit, which consists of the modulated audio-frequency carrier wave, is coupled through a condenser 42 to the mixing circuit which consists of four band-pass filters 43, 44, 45 and 46 all of which feed into a common conductor 50. While only one of the four audio channels has been shown in detail in Figure 1b, it is to be understood that the three remaining channels indicated by the blocks 47, 48 and 49, are identical with the one shown, each consisting of the tubes 30 and 40 and their associated circuits. As hereinbefore stated, the audio-frequency carrier in each of the four channels is assigned to a different frequency, it being preferable that these frequencies bear a nonharmonic relationship to one another. The frequencies 700, 1000, 1800 and 3500 cycles per second have been found to work very satisfactorily in the present apparatus. The band-pass filters 43, 44, 45 and 46 are provided in the mixing circuit for the purpose of preventing feed-back from the common circuit of signals from other channels, for preventing the changing of the volume output of one channel from changing that of all of the channels, and for preventing mismatching of the output impedance of the hexode tube. The band-pass filters are designed to pass a band having a width of approximately 100 cycles per second and thus serve to prevent the above enumerated difficulties when the modulated audio-frequency carrier waves are brought together in the common conductor 50. The composite wave is then led by a conductor 51 to the grid of a driver tube 52 which furnishes sufficient power for driving a power output tube 53. The output from the tube 53 is then applied to the primary of an output transformer 54, the secondary of which is connected into the microphone circuit of a standard aircraft radio transmitter 55. It is desirable that the transmitter 55 be of the frequency modulated type in order to reduce the effects of static, fading and other atmospheric disturbance on the radio-frequency carrier wave during its transmission to the receiving station on the ground.

The ground equipment is shown in Figure 2 of the drawings wherein a conventional radio receiver 57 receives from the antenna 58 the radio wave transmitted from the airplane. The output of the receiver, which contains the composite audio-frequency wave, is amplified by the tube 60 after which it is applied to the four band-pass filters 61, 62, 63 and 64 by means of the audio-frequency transformer 65. The band-pass filters shown in Figure 2 are similar to those shown in Figure 1b and serve to resolve the composite wave into the four audio-frequency carrier waves in order that they may be individually detected and the vibration waves then recorded. After separation by means of the filters, the individual carrier waves require a certain amount of amplification before detection, this being furnished in each case by means of a triode amplifier tube 68. After amplification, the audio-frequency carrier waves are each applied across the plate and cathode of a diode detector tube 69 and the detected output, which is the low-frequency vibration wave as originally furnished by the vibration pickup on the aircraft, is then applied to the grid of an amplifier tube 70. In order to remove any part of the carrier wave still remaining in the signal, the output from the tube 70 is passed through a low-pass filter 71 after which the signal is applied to a power amplifier 72 of standard make. This furnishes a sufficient power to operate the recording oscillograph 73 which produces a permanent record of the vibration waves obtained from the pickups located on the aircraft. The recording instrument 73 may be of the type comprising a loop of wire mounted for rotation in a magnetic field and having a small mirror attached to the loop. The current from the amplifier 72 is passed through this loop, thus causing the loop to rotate the mirror in accordance with the motion of the pickup on the aircraft. This motion is recorded on a tape and is, of course, a permanent record which may be referred to at any later date for an analysis of the flutter characteristics of the aircraft.

In order to conserve space, only one of the circuits following the band-pass filters has been shown, the remaining three circuits being indicated by the blocks 74, 75 and 76. These circuits are, of course identical with the one illustrated, each consisting of the elements 68, 69, 70, 71 and 72 together with their associated circuits.

From a knowledge of the sensitivity of the pickups in volts per inch per second and of the sensitivity of each of the channels in inches on the record tape per volt, the total magnification may be obtained as the product. The sensitivity of each of the channels is obtained by applying the fifty cycle per second calibrating wave of known amplitude to the inputs of the four channels while the sensitivity of the pickups, which would not be changed by the varying conditions encountered in flight, is obtained from laboratory calibrations.

Inasmuch as the apparatus shown in Figures 1a and 1b is carried on board the aircraft undergoing test, some means must be provided converting the low-voltage current from the electrical system of the aircraft into a high-voltage source such as is required by the plate and screen circuits of the various vacuum tubes. One possible form of apparatus for accomplishing this is shown in Figure 3 wherein a dynamotor 80 is utilized for converting the 12 volts D. C. obtained from the aircraft storage battery 81 into 350 volts, D. C. which is applied across a voltage divider 82 having taps 83, 84 and 85 for supplying the plates and screens of the various tubes. The plate of the stabilized oscillator tube 26 is supplied with a constant and unvarying voltage obtained from the voltage regulator tube 86. A rheostat 87 and a voltmeter 88 are provided in the line between the storage battery and the dynamotor in order to enable the supply voltage to be adjusted and maintained at a predetermined value.

From the foregoing it will be seen that the actual apparatus carried by the aircraft consists of two units in addition to the vibratory pickups. One of these units is the radio transmitter and the other is the structure shown in Figures 1a and 1b. Since most airplanes are already equipped with radio transmitters the added equipment consists solely of the latter unit which weighs in the neighborhood of forty pounds and is contained in a cabinet measuring approximately 2 feet by 1½ feet by 1½ feet. The more weighty and bulky recording appaartus is located at the ground station where it is unaffected by the severe gyrations of the airplane and where it is safe from damage in the event that the airplane should crash during the test.

As heretofore mentioned, readings from instruments other than the vibration pickups may be transmitted by means of our device, it being possible for example to transmit air speed readings in the same manner as the signals from the vibratory pickups. This is accomplished by using an air speed indicator of the propeller-driven, alternator type, the signal from which is fed into one of the four input channels in the same manner as the signal from the vibratory pickups. For example, the pickup $x$ of group 12 (Fig. 1a) may be replaced by an alternator of the type just described for the purpose of furnishing air speed data in place of flutter data from the aircraft undergoing test. Similarly the pickup $y$ of group 12 may be replaced by an engine-driven alternator for the purpose of supplying information concerning the engine speed of the aircraft being tested. It will, of course, be apparent that other pickups of the groups 10, 11 and 12 may be replaced by similar devices for generating signals which are representative of various other flight test data.

Accelerometer data may also be transmitted over the system by causing the accelerometer to stress a strain gage located in a bridge circuit. The bridge circuit will thus be unbalanced by the effect of the acceleration and if an audio-frequency signal of constant frequency is applied across the bridge, an output voltage will be obtained whose amplitude is proportional to the stress applied to the strain gage. Inasmuch as the voltage output from the bridge will be proportional to the stress exerted on the strain gage, it will be unnecessary to use the integrating circuit shown in Figure 1b. It will likewise be unnecessary to modulate an audio-frequency carrier wave with the signal obtained from the bridge since the frequency of latter signal will be constant and it can therefore be separated from the other signals at the ground station by means of a suitable band-pass filter. The output from the bridge may be mixed directly with the audio-frequency carrier waves by feeding this output into the conductor 90 (Fig. 1b) which is connected to a suitable band-pass filter 91. The output from this filter is led into the common conductor 50 where the signal is mixed with the audio-frequency carrier waves. At the ground station this audio signal may be filtered out by means of a similar band-pass filter 92 and led directly from the filter to an oscillograph 93 for recording. Detection will, of course, be unnecessary since this audio voltage is not modulated.

It is obvious that readings from many other types of test instruments commonly carried on an aircraft can be similarly transmitted over our system, the only requirement being that the reading to be telemetered be capable of representation by an electrical signal. This signal may be either of the constant frequency type or of the variable frequency type since either may be handled equally as well with our system.

It is to be understood, of course, that the form of the invention shown herein is for the purpose of illustration only and that we intend to be limited only by the prior art and the scope of the appended claim.

We claim:

A system for simultaneously recording at a ground station a plurality of flight test data obtained from an aircraft in flight comprising a plurality of pickups secured to the various parts of the aircraft to be tested, said pickups being divided into a plurality of groups each containing a predetermined number of pickups, said pickups each being adapted to produce an electrical signal corresponding to the vibrations produced in the part of the aircraft being tested, a plurality of electrical channels for receiving the signals from said pickups, said channels being equal in number to the number of pickups contained in each of said groups, a stabilized audio-frequency oscillator for producing a low-frequency calibrating signal of constant amplitude, means for successively and repeatedly applying the signals from each group of pickups and from said stabilized oscillator to said plurality of channels, an oscillator associated with each of said channels for generating an audio-frequency carrier wave of predetermined frequency, means coupled with each of said oscillators for modulating said audio-frequency carrier waves with the signals from said pickups and from said stabilized oscillator, means common to all of said channels and connected therewith for receiving all of said modulated audio-frequency carrier waves and combining them into a single composite wave, a conventional radio transmitter having an input circuit coupled with said receiving and combining means, said transmitter serving to transmit the composite wave from the aircraft to the ground station as modulation on a radio-frequency carrier wave, a conventional radio receiver located at the ground station for receiving and detecting the modulated radio-frequency carrier wave so as to yield to the composite wave, a plurality of band-pass filters connected with said receiver for separating the various audio-frequency carrier waves from the composite wave, a detector coupled with each of said band-pass filters for producing the original signals from said pickups and said stabilized oscillator, and means coupled with each of said detectors for simultaneously recording each of the detected signals.

JAMES J. DICKSON.
ORVILLE R. ROGERS.